United States Patent
Kuribayashi et al.

(10) Patent No.: US 6,761,214 B2
(45) Date of Patent: Jul. 13, 2004

(54) VEHICLE AIR CONDITIONER WITH MODE SWITCHING PATTERN

(75) Inventors: Nobukazu Kuribayashi, Kariya (JP);
Tatsumi Kumada, Gamagori (JP);
Shigeki Harada, Toyota (JP); Koichi Ito, Kariya (JP); Junji Yokoi, Toyota (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/191,640

(22) Filed: Jul. 9, 2002

(65) Prior Publication Data

US 2003/0029609 A1 Feb. 13, 2003

(30) Foreign Application Priority Data

Aug. 9, 2001 (JP) ........................................ 2001-242673

(51) Int. Cl.[7] ................................................. B60H 1/00
(52) U.S. Cl. ...................... 165/204; 165/202; 165/244; 454/75; 454/160
(58) Field of Search ................................ 165/244, 202, 165/203, 204, 42; 454/69, 75, 160

(56) References Cited

U.S. PATENT DOCUMENTS

| | | | |
|---|---|---|---|
| 5,052,282 A | * | 10/1991 | Scharamm et al. |
| 5,070,770 A | * | 12/1991 | Cassidy ...................... 454/160 |
| 5,338,249 A | | 8/1994 | Hildebrand et al. |
| 5,908,154 A | * | 6/1999 | Sunaga et al. .......... 165/204 X |
| 5,992,156 A | * | 11/1999 | Isobe et al. |
| 6,138,749 A | * | 10/2000 | Kawai et al. ................ 165/204 |
| 6,352,102 B1 | * | 3/2002 | Takechi et al. ................ 165/42 |
| 6,383,071 B1 | * | 5/2002 | Takeuchi et al. |

FOREIGN PATENT DOCUMENTS

| | | |
|---|---|---|
| DE | 100 58 953 | 6/2001 |
| EP | 0 457 935 A1 * | 11/1991 |
| EP | 0 979 744 | 2/2000 |
| EP | 0 983 884 | 3/2000 |
| JP | A6-286458 | 10/1994 |
| JP | 2003-054241 | 2/2003 |

OTHER PUBLICATIONS

Office Action dated Nov. 20, 2003 from corresponding European Application No. 02 01 6203.

* cited by examiner

*Primary Examiner*—Ljiljana Ciric
(74) *Attorney, Agent, or Firm*—Harness, Dickey & Pierce, PLC

(57) ABSTRACT

A vehicle air conditioner has an actuator for driving an air mixing door and various mode switching doors. An automatic range and a manual range are set in different operating angle ranges of the actuator. In the automatic range, an air outlet mode is automatically switched in accordance with an opening degree of the air mixing door. On the other hand, in the manual range, a multi-mode or a defroster mode is manually set, regardless of the opening degree of the air mixing door. In the manual range, air is simultaneously blown from all openings such as a face opening, a foot opening and a defroster opening in the multi-mode, and air is blown from the defroster opening in the defroster mode.

16 Claims, 10 Drawing Sheets

FIG. 9
| | PASSENGER'S REQUESTS | NECESSARY MODE |
|---|---|---|
| SUMMER | COOL UPPER AND LOWER SIDES AND PREVENT FEET SWEATY | B/L |
| | COOL AND DRY FEET | FOOT |
| | PREVENT DIRECT AIR BLOWN TO CHILD | B/L, FOOT |
| | PREVENT AIR BLOWN TO FACE IN SMOKING | F/D, DEF |
| WINTER | WARM UP UPPER AND LOWER SIDES AND HANDS | B/L |
| | INTRODUCE WARM AIR TO REAR SEAT | FACE, B/L |
| | DEFROSTE WINDSHIELD AND WARM UP FEET | F/D |
FIG. 11
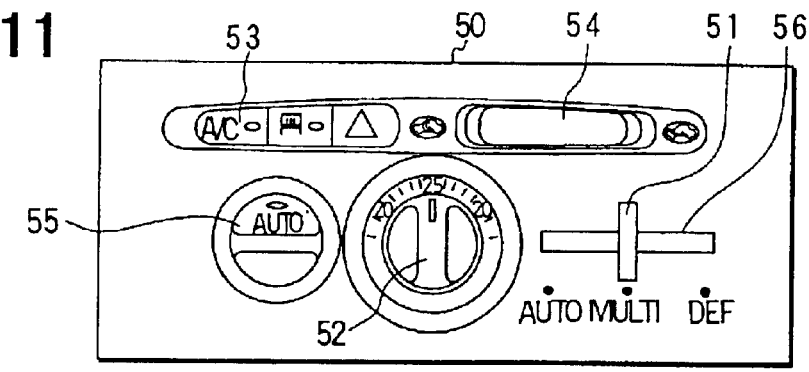
FIG. 12
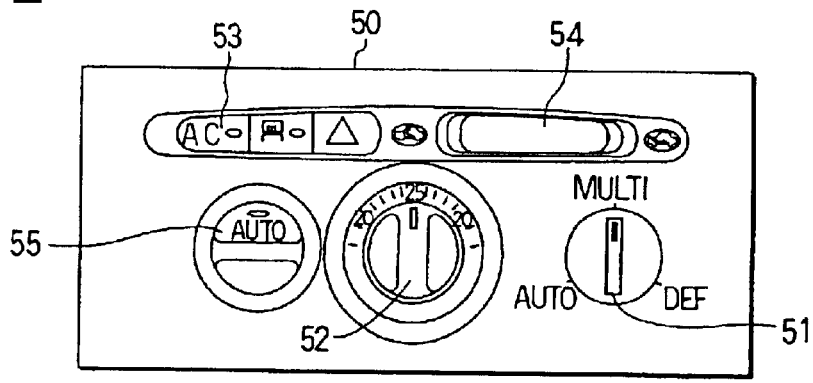

VEHICLE AIR CONDITIONER WITH MODE SWITCHING PATTERN

CROSS-REFERENCE TO RELATED APPLICATION

This application is related to and claims priority from Japanese Patent Application No. 2001-242673 filed on Aug. 9, 2001, the content of which is hereby incorporated by reference.

BACKGROUND OF THE INVENTION

1. Field of the Invention

The present invention relates to a driving system for driving mode switching doors and a temperature control unit by using a single actuator in a vehicle air conditioner. More particularly, the present invention relates to a mode switching pattern when an air outlet mode is manually set.

2. Description of Related Art

In a conventional vehicle air conditioner, an inside/outside air switching door, mode switching doors and a temperature control unit such as an air mixing door and a hot water valve are independently operated by actuators (servomotors), respectively. Therefore, many actuators are required, thereby increasing production cost of the vehicle air conditioner.

In order to reduce the number of the actuators, the inventors of the present invention proposes a single actuator for performing an air temperature control and a switching operation of an air outlet mode. That is, the air outlet mode is switched to a face mode, a bi-level mode and a foot mode as an operation position of a temperature control unit moves from a low-temperature side to a high-temperature side, so that the temperature control and the switch operation of the air outlet mode are performed by the single actuator.

However, when the temperature control and the switching operation of air outlet mode are performed by using the single actuator, the relationship between the operation position of the temperature control unit and the switching operation of the air outlet mode is fixed at a fixed relationship. Accordingly, for example, it is impossible to set an air-conditioning state where high-temperature air or low-temperature air is blown toward upper and lower sides in a passenger compartment in the bi-level mode, and a selection range of the air conditioning state becomes narrow. Alternatively, it is difficult to set a defroster mode whenever a windshield is fogged, regardless of the operation position of the temperature control unit.

SUMMARY OF THE INVENTION

In view of the foregoing problems, it is a first object of the present invention to provide a vehicle air conditioner where an automatic range and a manual range can be set at different operation angle ranges of an actuator while a temperature control unit and a mode switching member can be operated by the actuator. In the automatic range, one of air outlet modes is automatically switched in accordance with an operation position of the temperature control unit. In the manual range, only a multi-mode or a defroster mode is manually switched at any time by a passenger.

It is a second object of the present invention to reduce of an operation angle of the actuator in the vehicle air conditioner.

It is a third object of the present invention to restrict a temperature change in air blown into a passenger compartment in a mode switching of the manual range.

According to the present invention, in a vehicle air conditioner, a single actuator for driving both a temperature control unit and a mode switching member is operated in a first operation angle range and in a second operation angle range different from the first operation angle range, and a control unit for controlling operation of the actuator sets an automatic range in the first operation angle range of the actuator, and a manual range in the second operation angle range in the actuator. In the automatic range, one mode among plural air outlet modes is automatically switched by the mode switching member in accordance with an operation position of the temperature control unit. On the other hand, in the manual range, one of predetermined modes is manually set by the mode switching member, regardless of the operation position of the temperature control unit. In addition, the predetermined modes in the manual range are only a multi-mode where air is blown simultaneously from a face opening, a foot opening and a defroster opening, and a defroster mode where air is blown from the defroster opening. By setting the multi-mode, functions corresponding to a bi-level mode and a foot/defroster mode can be obtained. Because only the multi-mode and the defroster mode are set in the manual range, an operation angle range of the actuator for the manual range can be made smaller, and an entire operation angle of the actuator can be reduced. Further, the change in the temperature of air blown into the passenger compartment can be restricted in the manual range, and air-conditioning felling for a passenger in a passenger compartment can be improved in the manual range. Here, the air outlet modes in the automatic range can include a face mode where air is blown from the face opening, a bi-level mode where air is blown from both the face opening and the foot opening, and a foot mode where air is blown from the foot opening.

Preferably, among the multi-mode and the defroster mode in the manual range, the multi-mode is set adjacent to the automatic range, relative to a change of the operation angle of the actuator. Therefore, the multi-mode that satisfies general requests of the passenger can be readily manually set in a short time only by slightly changing the operation angle of the actuator from the automatic range. Alternately, among the multi-mode and the defroster mode in the manual range, the defroster mode is set adjacent to the automatic range relative to the change of the operation angle of the actuator. In this case, the defroster mode required for a safety driving can be set by slightly changing the operation angle of the actuator from the automatic range in a short time. Therefore, in this case, a windshield of the vehicle can be rapidly defrosted.

Preferably, a single operation member is disposed to manually set the multi-mode and the defroster mode in the manual range by a manual operation of the operation member. Therefore, the multi-mode and the defroster mode in the manual range can be readily manually set.

BRIEF DESCRIPTION OF THE DRAWINGS

Additional objects and advantages of the present invention will be more readily apparent from the following detailed description of preferred embodiments when taken together with the accompanying drawings, in which:

FIG. 9 is a view showing an examination result performed by the inventors of the present invention, for a manual air outlet mode;

FIG. 11 is a front view showing an example of an air-conditioning operation panel used in a third preferred embodiment of the present invention;

FIG. 12 is a front view showing an example of an air-conditioning operation panel used in a fourth preferred embodiment of the present invention.

DETAILED DESCRIPTION OF THE PRESENTLY PREFERRED EMBODIMENTS

Figure 1:
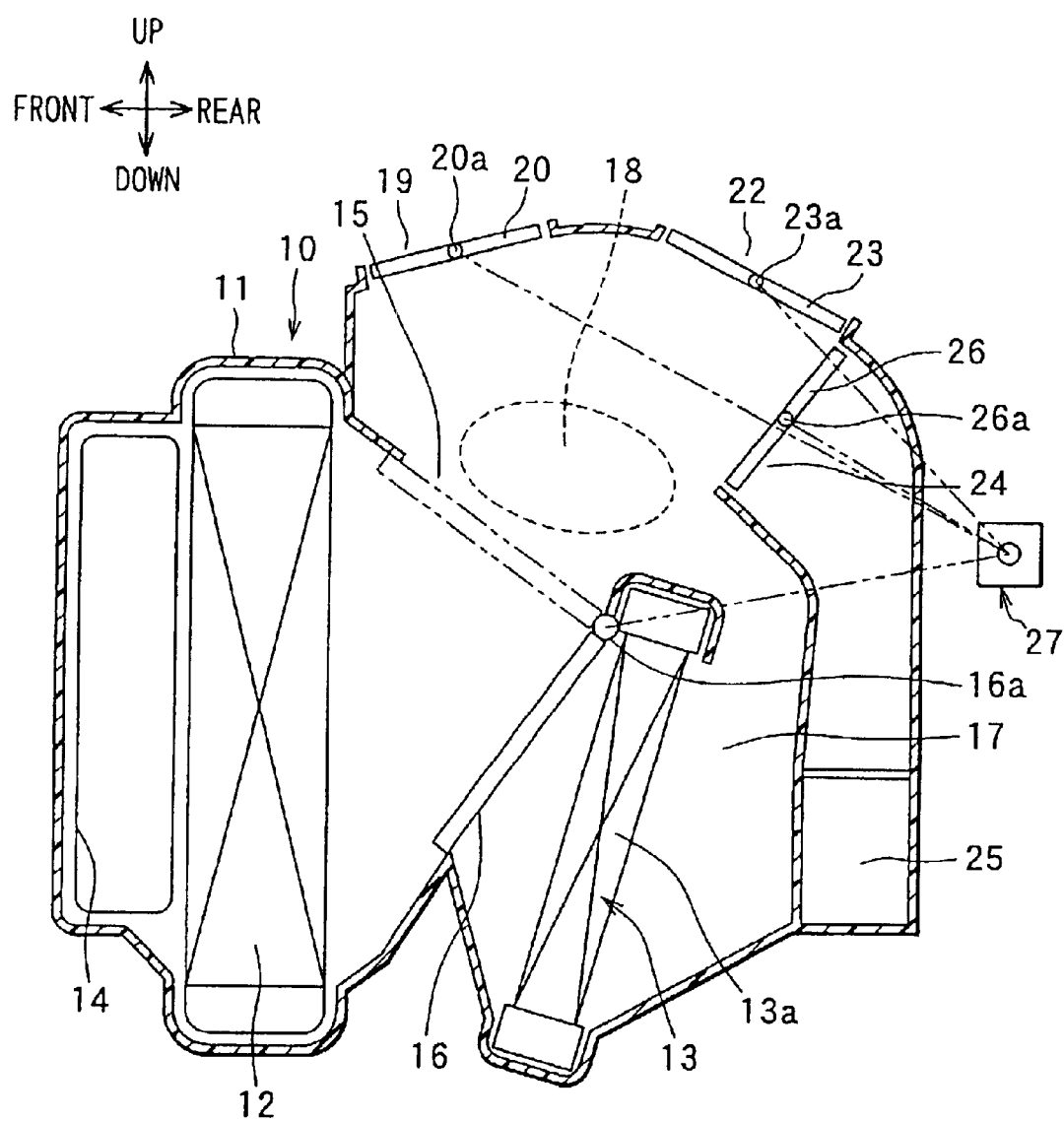
FIG. 1 is a schematic sectional view showing a main part of a vehicle air conditioner according to a first preferred embodiment of the present invention.

Preferred embodiments of the present invention will be described hereinafter with reference to the accompanying drawings.

A first preferred embodiment of the present invention will be now described with reference to FIGS. 1–9. In the first embodiment of the present invention, a vehicle air conditioner is a semi-center arrangement type, for example. An air conditioning unit 10 of the vehicle air conditioner is disposed in a vehicle to correspond to the arrangement shown in FIG. 1 in a vehicle up-down direction and a vehicle front-rear direction. The air conditioning unit 10 is disposed inside a dashboard located at a front side in a passenger compartment, at a substantially center portion in a vehicle right-left direction. The up-down direction, the front-rear direction and the right-left direction in FIGS. 2A, 2B are actual directions in the vehicle.

A blower unit (not shown), for blowing air into the air conditioner 10, is disposed to be offset from the air conditioning unit 10 to a side (assistant seat side) in the vehicle right-left direction. As known well, the blower unit includes an inside/outside air switching box for switching and introducing inside air or outside air. Further, the blower unit includes a centrifugal electrical blower fan for blowing air, introduced from the inside/outside air switching box, into the air conditioning unit 10.

The air conditioning unit 10 includes an air conditioning case 11 made of a resin, for defining an air passage through which air flows from a vehicle front side to a vehicle rear side while passing through an evaporator 12 and a heater core 13 disposed therein.

In the air passage of the air conditioning case 11, the evaporator 12 positioned at an upstream air side of the heater core 13 is disposed at a vehicle front side of the heater core 13. As well known, the evaporator 12 is a cooling heat exchanger for cooling air by absorbing heat from air as evaporation latent heat of refrigerant in a refrigerant cycle. The heater core 13 is a heating heat exchanger for heating air using hot water (cooling water) from a vehicle engine as a heating source. The air conditioning case 11 has an air inlet portion 14, from which air blown from the blower unit flows into the air passage, on a side surface thereof at the most vehicle front side and at a side of the assistant seat.

A cool air bypass passage 15 is provided in the air conditioning case 11 at an upper side of the heater core 13, and a plate-like air mixing door 16 is disposed immediately at a downstream air side of the evaporator 12 (rear side of the vehicle) rotatably around a rotation shaft 16a. The air mixing door 16 controls temperature of air to be blown into a passenger compartment to a desired temperature by adjusting a mixing ratio between air passing through the cool air bypass passage 15 and air passing through a core portion 13a of the heater core 13. That is, in the first embodiment, the air mixing door 16 constructs a temperature control unit of air blown into the passenger compartment.

A warm air passage 17 is provided to extend in the up-down direction at a position immediately after the heater core 13. Warm air from the warm air passage 17 and cool air from the cool air bypass passage 15 are mixed in an air mixing space 18 of the air conditioning case 11, so that conditioned air having a desired temperature can be obtained.

Plural air openings through which conditioned air is blown into the passenger compartment are provided in the air conditioning case 11 at a downstream air side of the air passage. Among the air openings, a defroster opening 19 is provided in the air conditioning case 11 on an upper side surface at a substantial center in the vehicle front-rear direction. Conditioned air is blown toward an inside surface of a windshield of the vehicle from the defroster opening 19 through a defroster duct (not shown). The defroster opening 19 is opened and closed by a plate-like defroster door 20 disposed rotatably around a rotation shaft 20a.

A face opening 22 is provided in the air conditioning case 11 on the upper side surface at a rear side position of the defroster opening 19. The face opening 22 communicates with a pair of center face air outlets 72 and a pair of side face air outlets 73 of the dashboard 70 through face ducts, so that conditioned air is blown toward the head portion of a passenger in the passenger compartment from the face air outlets 72, 73. The face opening 22 is opened and closed by a plate-like face door 23 disposed rotatably around a rotation shaft 23a.

Inlet ports of side face ducts connected to the side face air outlets 73 at both right and left sides in the dashboard 70 are provided to be always opened by a notch portion of the face door 23 even when the face opening 23 is closed by the face door 23. The side face air outlets 73 are provided adjacent to both right and left ends of the dashboard 70 on an upper surface of the dashboard 70. The center face air outlets 72 are provided at two right and left positions around the center on the upper surface of the dashboard 70 in the vehicle right-left direction. A shutting mechanism 72a is provided in each of the center face air outlets 72 to shut an air flow from the center face air outlet 72.

The shutting mechanism 72a can be constructed to have various structures. For example, the shutting mechanism can be constructed by a grill air guiding member rotatably held in a frame portion of the center face air outlet 72. In this case, rotation shafts are provided integrally with both end portions of the grill air guiding member, and the grill air guiding member is rotatably held in the frame portion of the center face air outlet 72 by the rotation shafts to be manually rotated by a manual operation.

FIG. 2A shows a state where both the center face air outlets 72 are opened by the shutting mechanisms 72a. When the shutting mechanism 72a is manually rotated by an approximate right angle in the vehicle up-down direction from the state in FIG. 2A, the air flow from the center face air outlet 72 is shut by a plate surface of the shutting mechanism 72a, as shown in FIG. 2B.

In the first embodiment, a door member may be independently disposed at an upstream air side of the grill air guiding member, and the shutting mechanism 72a may be constructed by the door member. Similarly to that in the center face air outlets 72, the grill air-guiding member may be provided in the side face air outlets 73, and the shutting mechanism using the grill air-guiding member or a shutting mechanism separated from the grill air-guiding member may be used.

Figure 2A:
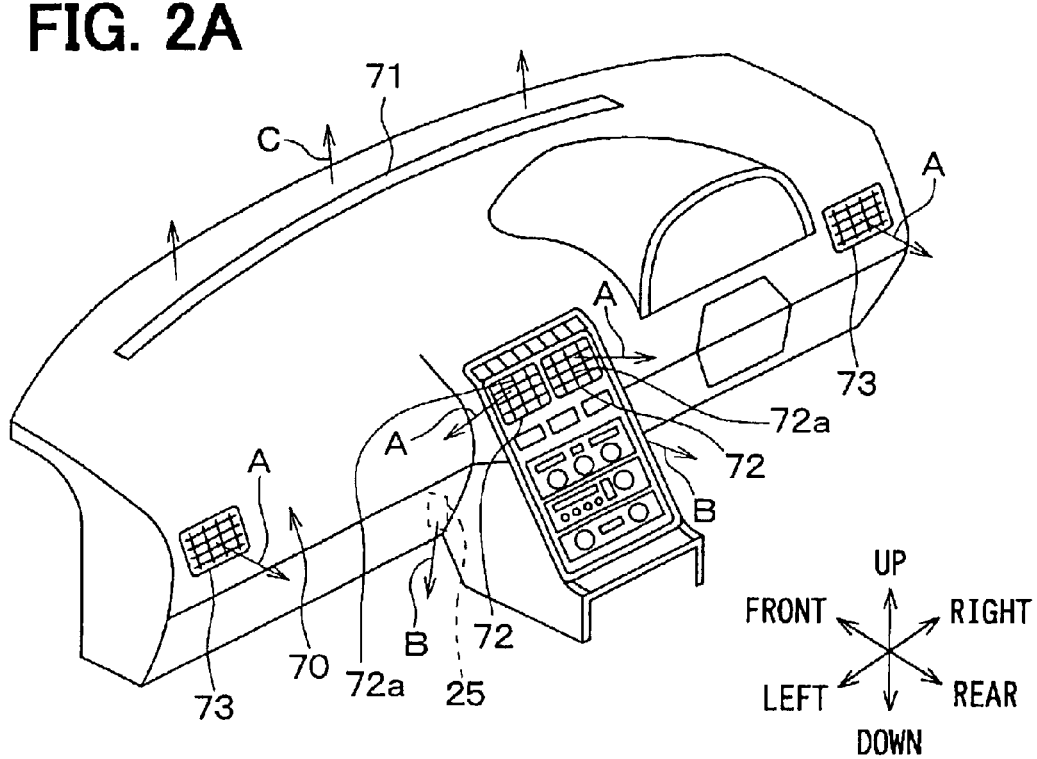
FIGS. 2A and 2B are perspective views each showing a dashboard having air outlet ports of the vehicle air conditioner, according to the first embodiment.
Figure 2B:
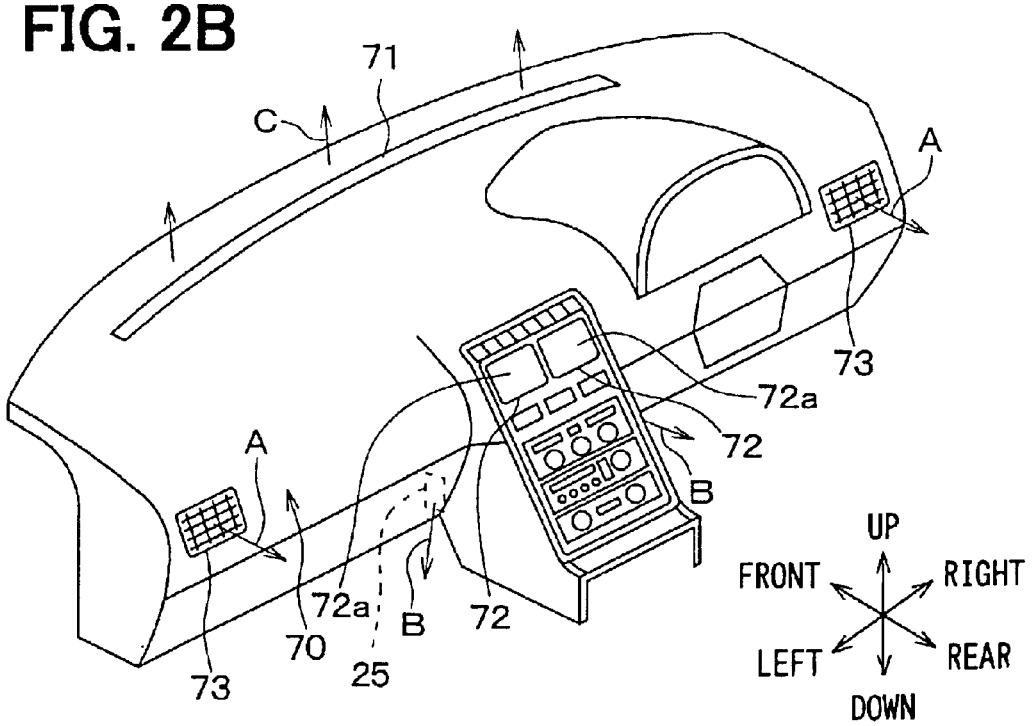

As shown in FIG. 1, a foot opening 24 is provided in the air conditioning case 11 at a lower side of the face opening 22, to communicate with foot air outlets 25 provided at right and left sides of the air conditioning case 11 on a downstream air side. Warm air is blown toward the foot portion of a passenger in the passenger compartment from the foot air outlets 25. The foot opening 24 is opened and closed by a plate-like foot door 26 disposed rotatably around a rotation shaft 26a.

In FIG. 1, the openings 19, 22, 24 are opened and closed by the three doors 20, 23, 26, respectively. However, the defroster opening 19 and the face opening 22 can be opened and closed by a common single door as known well, or the face opening 22 and the foot opening 24 can be opened and closed by a common single door.

One side end portions of the rotation shaft 16a of the air mixing door 16, the rotation shaft 20a of the defroster door 20, the rotation shaft 23a of the face door 23 and the rotation shaft 26a of the foot door 26 protrude outside the air conditioning case 11, and are linked to one actuator 27 through a link mechanism and the like of a door driving system. In the first embodiment of the present invention, by operation of the actuator 27, the air mixing door 16 for the temperature control and the mode switching doors 20, 23, 26 are opened and closed.

For example, the actuator 27 includes a direct current motor (servomotor) and a position detector for detecting a rotational position of the motor. In this case, the actuator 27 can control a rotational position thereof at a predetermined rotational position and can be rotated clockwise or counterclockwise. As the actuator 27, a step motor and the like can be used. In this case, a rotational position of the actuator 27 can be controlled at a predetermined rotational position using pulse number signals inputted thereto.

Next, the door driving system, for driving the air mixing door 16 and the mode switching doors 20, 23, 26, using the single actuator 27 will be now described with reference to FIGS. 3–5.

Figure 3:
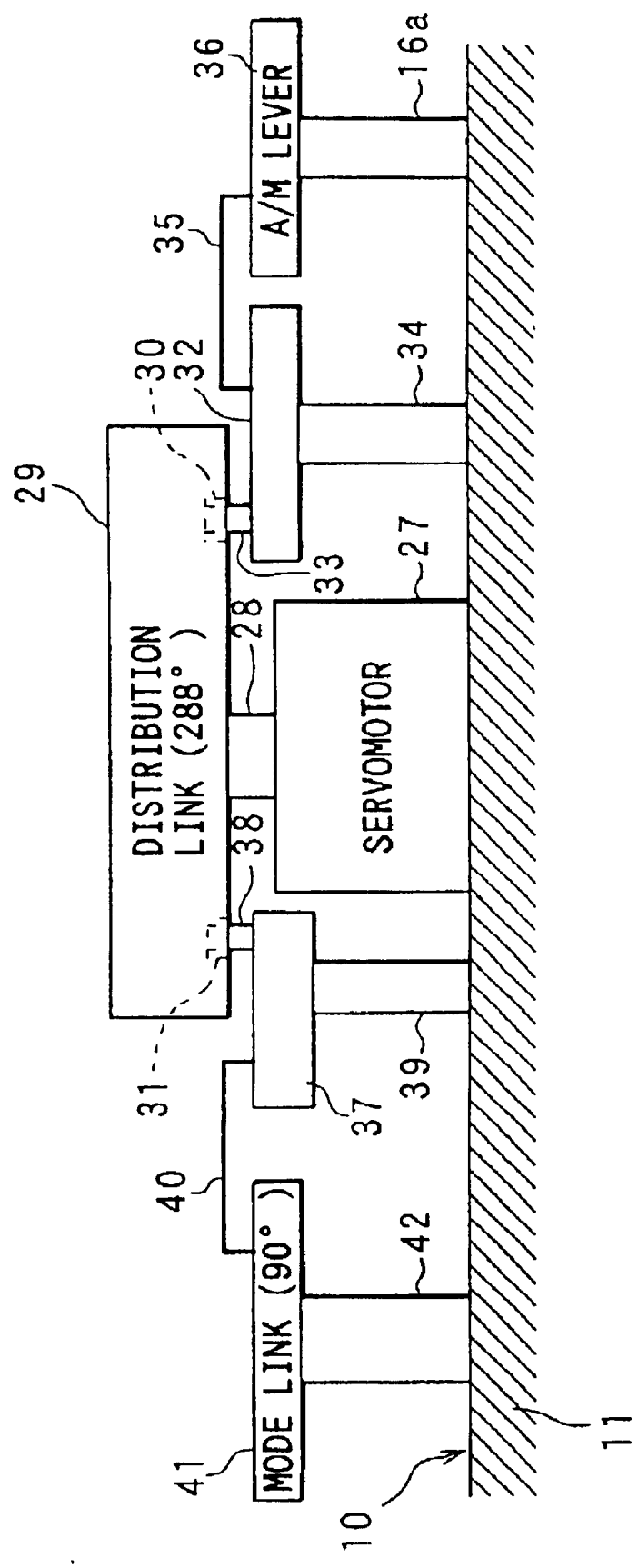
FIG. 3 is a schematic view showing a link mechanism of a door driving system used for the vehicle air conditioner of the first embodiment.
Figure 4:
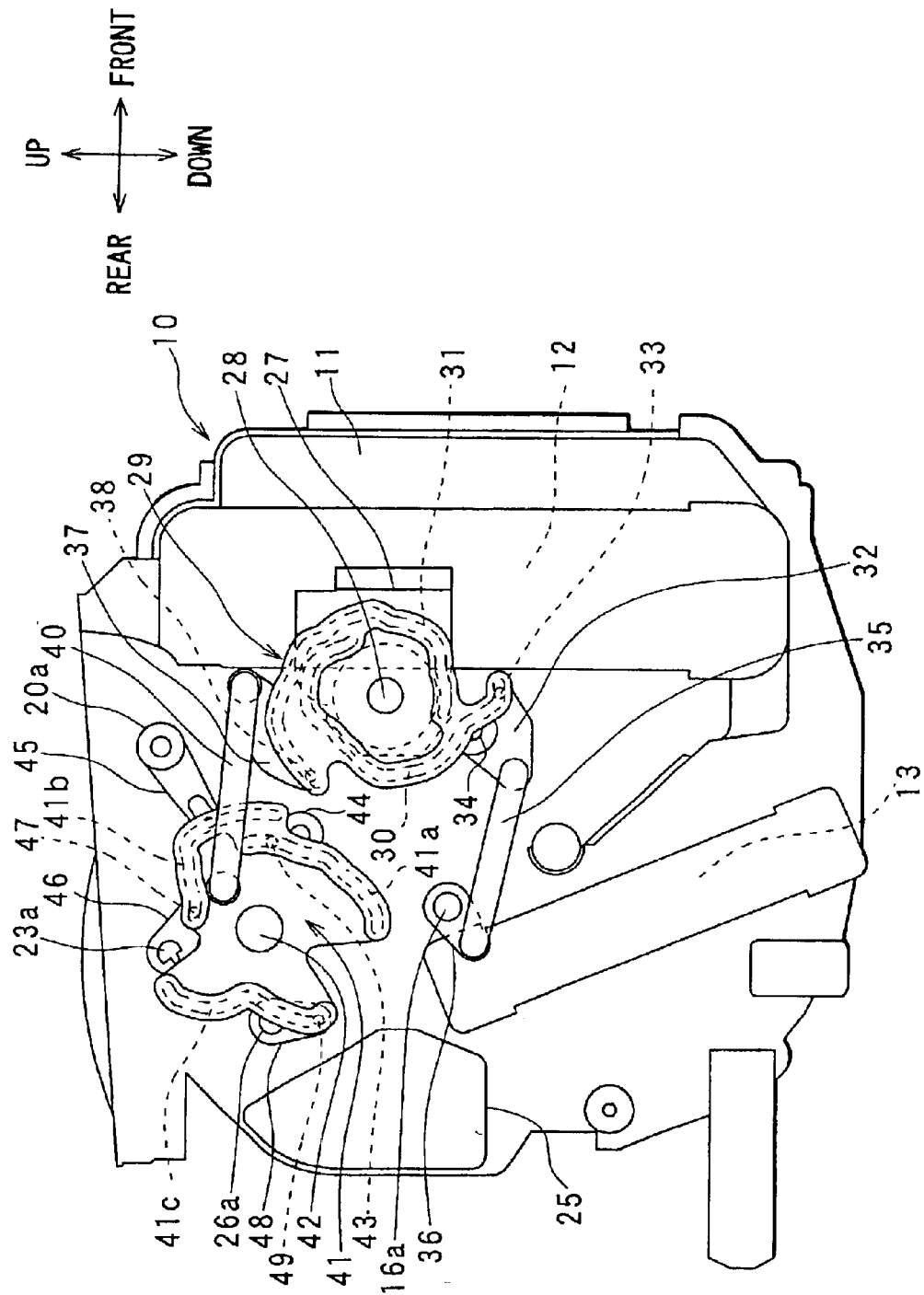
FIG. 4 is a schematic view showing a mounting state of the door driving system in an air conditioning unit of the vehicle air conditioner according to the first embodiment.

As shown in FIGS. 3 and 4, the actuator 27 made of a servomotor is disposed on an outside surface of the air conditioning case 11 at a predetermined position (e.g., driver-seat side), and an output shaft 28 of the actuator 27 is integrally connected to a distribution link 29. As shown in FIG. 4, the distribution link 29 has an approximate disk shape. One surface (back side surface in FIG. 4) of the distribution link 29 has a temperature-control engagement groove 30 and a mode-switching engagement groove 31. As shown in FIG. 4, the grooves 30 and 31 are formed into approximate C shapes, and the distribution link 29 is provided such that the bending directions of the approximate C shapes are opposite to each other.

A pin 33 integrally provided with a connection lever 32 is slidably fitted into the temperature-control engagement groove 30, as shown in FIG. 3. The connection lever 32 is rotatably supported to the air conditioning case 11 by a rotation shaft 34, and is linked to an air-mixing door lever 36 through a connection rod 35.

The air-mixing door lever 36 is integrally connected to the rotation shaft 16a of the air mixing door 16 so as to be rotated together with the air mixing door 16. Accordingly, the pin 33 is displaced along the shape of the temperature-control engagement groove 30 due to rotation of the distribution link 29, so that the air mixing door 16 is rotated around the rotation shaft 16a through the connection lever 32, the connection rod 35 and the air mixing door lever 36.

The air mixing door 16 is rotated between a maximum cooling position (i.e., the position where an air passage of the heater core 13 is fully closed) indicated by the solid line in FIG. 1 and a maximum heating position (i.e., position where the cool air bypass passage 15 is fully closed) indicated by the chain line in FIG. 1. An opening degree of the air mixing door 16 is set at 0% in the maximum cooling position (lowest temperature position) and is set at 100% in the maximum heating position (highest temperature position).

A pin 38 integrally provided with a connection lever 37 is slidably fitted in the mode-switching engagement groove 31, as shown in FIG. 3. The connection lever 37 is rotatably supported to the air conditioning case 11 through a rotation shaft 39, and is linked to a mode link 41 through a connection rod 40. The mode link 41 is rotatably supported to the air conditioning case 11 by a rotation shaft 42.

The mode link 41 is provided with a defroster engagement groove 41a, a face engagement groove 41b and a foot engagement groove 41c. A pin 43 is slidably fitted into the defroster engagement groove 41a, and an intermediate lever 44 is rotated in accordance with a displacement of the pin 43. A driving lever 45 of the defroster door 20 is rotated around the rotation shaft 20a of the defroster door 20 through the intermediate lever 44, so that the defroster door 20 can be rotated.

A pin 47 of a driving lever 46 of the face door 23 is slidably fitted into the face engagement groove 41b, and a pin 49 of a driving lever 49 of the foot door 26 is slidably fitted into the foot engagement groove 41c. The face door 23 and the foot door 26 can be rotated around the rotation shafts 23a, 26a in accordance with displacement of the pins 47, 49 through the driving levers 46, 48, respectively.

Figure 5:
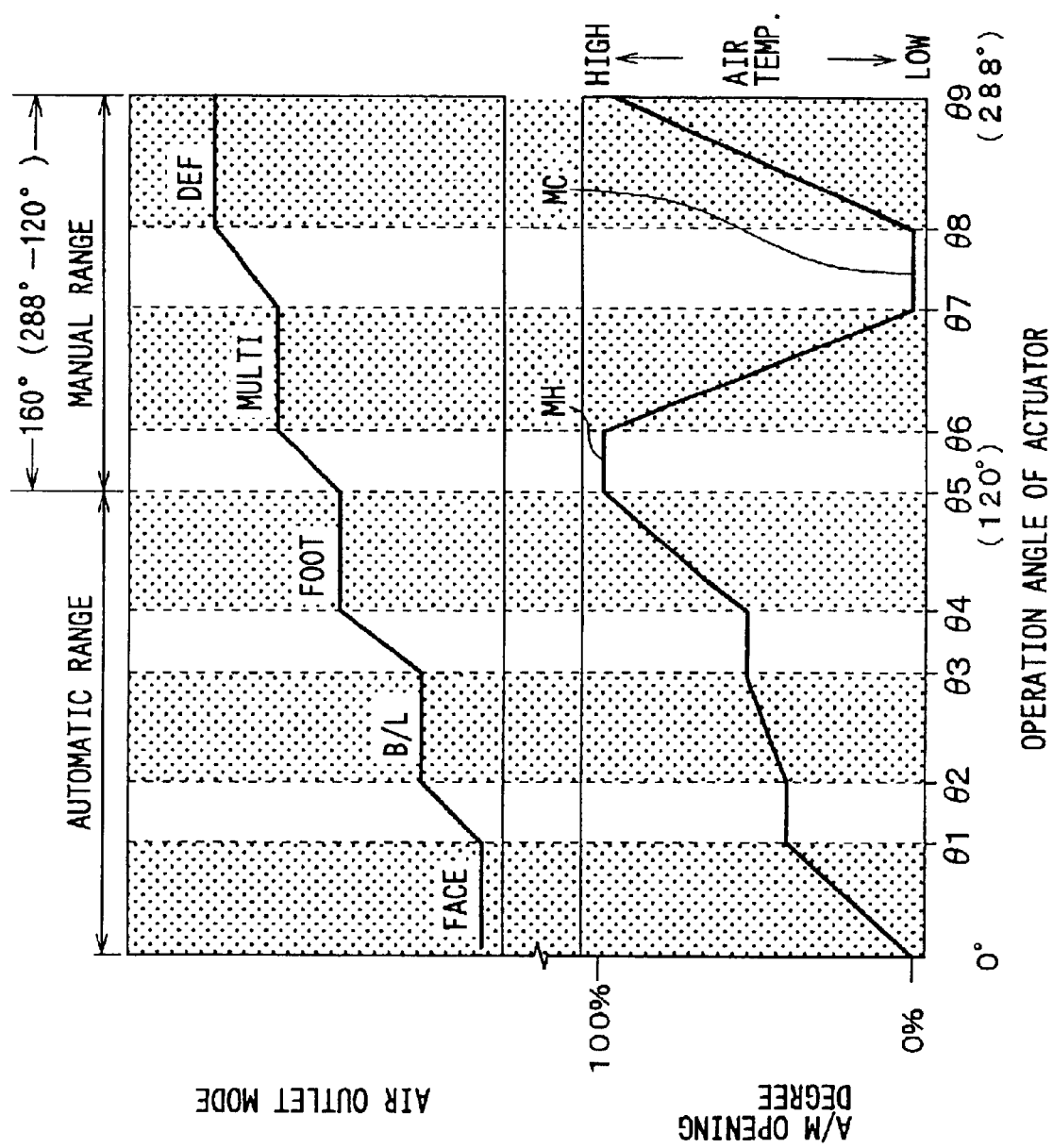
FIG. 5 is a view for explaining operation characteristics of the vehicle air conditioner according to the first embodiment.

FIG. 5 shows an opening degree change of the air mixing door 16 and an air outlet mode change, relative to an operation angle change of the actuator (servomotor) 27. As shown in FIG. 5, a temperature control pattern, where an opening degree of the air mixing door 16 is changed between 0% (maximum cooling position MC) and 100% (maximum heating position MH), is repeated three times when an operation angle of the actuator 27 changes by 288 degrees.

Specifically, when the operation angle of the actuator 27 is in a range between 0° and θ5 (e.g., 120° in this embodiment), the opening degree of the air mixing door 16 is changed in a range from 0% to 100%, and the air outlet mode is automatically switched to the face mode, the bi-level mode and the foot mode, in this order in accordance with an increase of the opening degree of the air mixing door 16. That is, the operation range of the actuator 27 between 0° and θ5 is an automatic range in which the air outlet mode is automatically switched in accordance with the opening degree of the air mixing door 16.

On the other hand, when the operation angle of the actuator 27 is in a range between θ5 and θ9 (e.g., 288° in this embodiment), the air outlet mode is manually switched. That is, in the operation range of the actuator 27 between θ6 and θ7; , a multi-mode is manually set as a manual air outlet mode. The multi-mode is fixed in the operation range between θ6 and θ7, and the opening degree of the air mixing door 16 is changed in an entire area between 100%–0%. In the multi-mode, all the defroster opening 19, the face opening 22 and the foot opening 24 are opened at the same time, so that air is simultaneously blown into the passenger compartment from the defroster air outlet 71, the face air outlets 72, 73 and the foot air outlets 25. In the operation range of the actuator 27 between θ8 and θ9, a defroster mode is manually set as the manual air outlet mode so that the defroster opening 19 is opened by the defroster door 20. The defroster mode is fixed in the operation range between θ8 and θ9, and the opening degree of the air mixing door 16 is changed in the entire area between 0%–100%.

In FIG. 5, dotted areas indicate changing areas where the opening degree of the air mixing door 16 changes relative to a change of the operation angle of the actuator 27, and white areas indicate switching areas where the air outlet mode is switched by driving the mode switching doors 20, 23, 26. In this embodiment, the dotted areas for driving the air mixing door 16 and the white areas for driving the mode switching doors 20, 23, 26 are set alternately. Therefore, an operation torque necessary for the actuator 27 can be reduced, and the size of the actuator 27 can be reduced.

In order to alternately drive the air mixing door 16 and the mode switching doors 20, 23, 26, a driving groove portion for driving the pins 33, 38 and an idling groove portion for stopping the driving of the pins 33, 38 are provided alternately in a groove elongating direction in the temperature-control engagement groove 30 and the mode-switching engagement groove 31 of the distribution link 29. In this embodiment, the idling groove portion is substantially formed into a circular arc groove where the rotation center of the distribution link 29, that is, the motor output shaft 28 is used as a rotation center. Therefore, even when the distribution link 29 rotates, the pins 33, 38 are not driven in predetermined operation ranges.

Specifically, in the temperature-control engagement groove 30, relative to the operation angle change of the actuator 27, the pin 33 is driven by the driving groove portions in the five dotted areas, so that the air mixing door 16 is driven. Conversely, in the white areas in FIG. 5, because the pin 33 is positioned in the idling groove portions, the operation of the pin 33 is stopped, and the opening degree of the air mixing door 16 is fixed.

Further, in the mode-switching engagement groove 31, when the pin 38 is positioned within the idling groove portions in the five dotted areas, the operation of the pin 38 is stopped, and mode switching doors 20, 23, 26 are maintained at predetermined positions. Therefore, in this case, the air outlet mode is fixed at a predetermined mode. On the other hand, in the four white areas in FIG. 5, because the pin 38 is positioned in the driving groove portions, the pin 38 is driven, and an air outlet mode is switched by changing operation positions of the mode switching doors 20, 23, 26.

Figure 6:
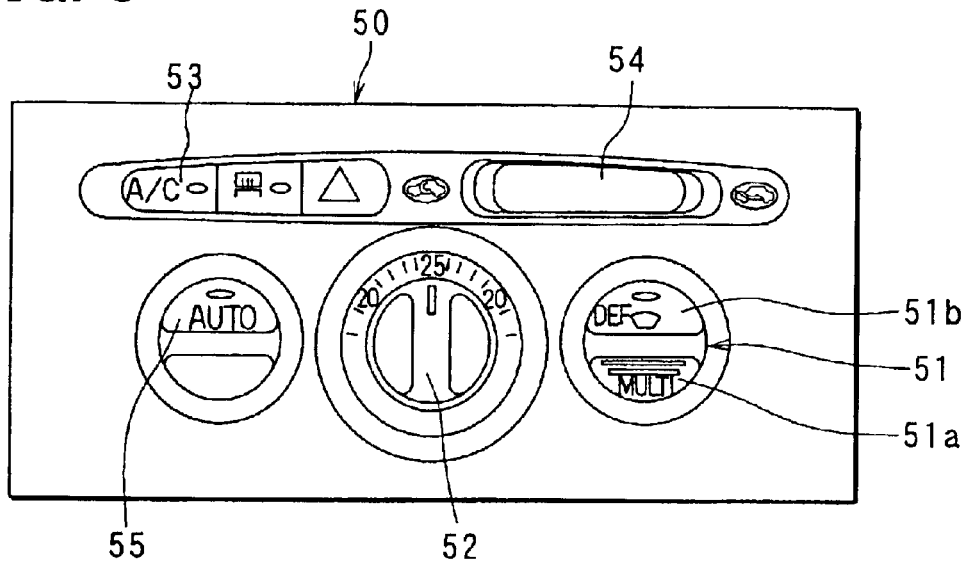
FIG. 6 is a front view showing an example of an air-conditioning operation panel used in the first embodiment.

FIG. 6 shows an example of an air-conditioning operation panel 50 according to the first embodiment. The air-conditioning operation panel 50 includes a mode switching knob 51 which is a mode-setting operation member. The mode switching knob 51 includes a push-button multi-mode switch 51a that sends a signal for manually setting the multi-mode, and a push-button defroster switch 51b that sends a signal for manually setting the defroster mode. Both the switches 51a, 51b are provided such that when one of the switches 51a, 51b is turned on, the other one thereof is turned off. Further, in a turning-on state of one switch 51a, 51b, when the one switch 51a, 51b is pushed again, the turning-on state of the one switch 51a, 51b is released.

Further, the air-conditioning panel 50 includes a temperature setting member 52 with a rotary knob, a push-button air-conditioning switch 53, a push-button inside/outside air switch 54, a push-button automatic switch 55 and the like in addition to the mode switching knob 51. As well known, the temperature setting member 52, the air-conditioning switch 53, and the inside/outside air switch 54 generate a temperature setting signal, an interrupting signal for an air-conditioning compressor, and an inside/outside air switching signal for the blower unit, respectively.

The automatic switch 55 is used for setting an air-conditioning automatic control including operation of the blower, and for setting an automatic switching state of the air outlet mode in the automatic range in FIG. 5.

Figure 7:
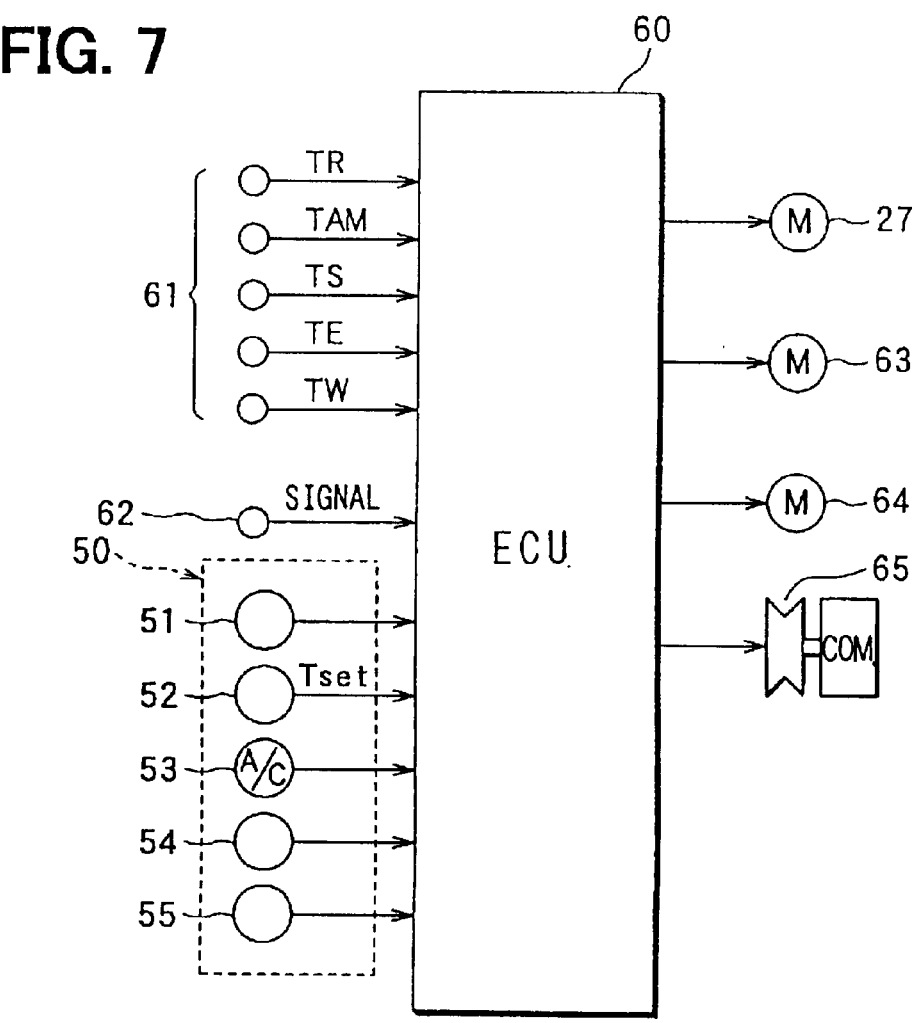
FIG. 7 is a block diagram showing electric control of an electronic control unit (ECU) according to the first embodiment.

Next, control operation of an electronic control unit (ECU) according to the first embodiment will be now described with reference to FIGS. 7 and 8. Detection signals are inputted into the electronic control unit (ECU) 60 from a sensor group 61 for detecting an inside air temperature TR, an outside air temperature TAM, a solar radiation amount TS, an evaporator air temperature (evaporator cooling degree) TE, a hot water temperature TW and the like.

Further, operation signals such as an operation position signal of the mode switching knob 51, a set temperature signal from the temperature setting member 52, an interrupting signal (ON/OFF signal) for a compressor of an air-conditioning refrigerant cycle from the air-conditioning switch 53, an inside/outside air switching signal from the inside/outside air switch 54 and an air amount switching signal from the blower switch 55 are inputted into the ECU 60. In addition, an operation angle signal is inputted into the ECU 60 from a rotational position sensor (potentiometer) 62 of the actuator 27.

The ECU 60 is composed of a well-known microcomputer, which includes a central processing unit (CPU), a read only memory (ROM), a random access memory (RAM), its peripheral circuits and the like. The ECU 60 performs a predetermined calculation based on a preset program, thereby controlling energization for the actuator 27, the inside/outside air switching door, a driving actuator (servomotor) 63, a blower motor 64, a solenoid clutch 65 for interrupting operation of the compressor and the like.

Figure 8:
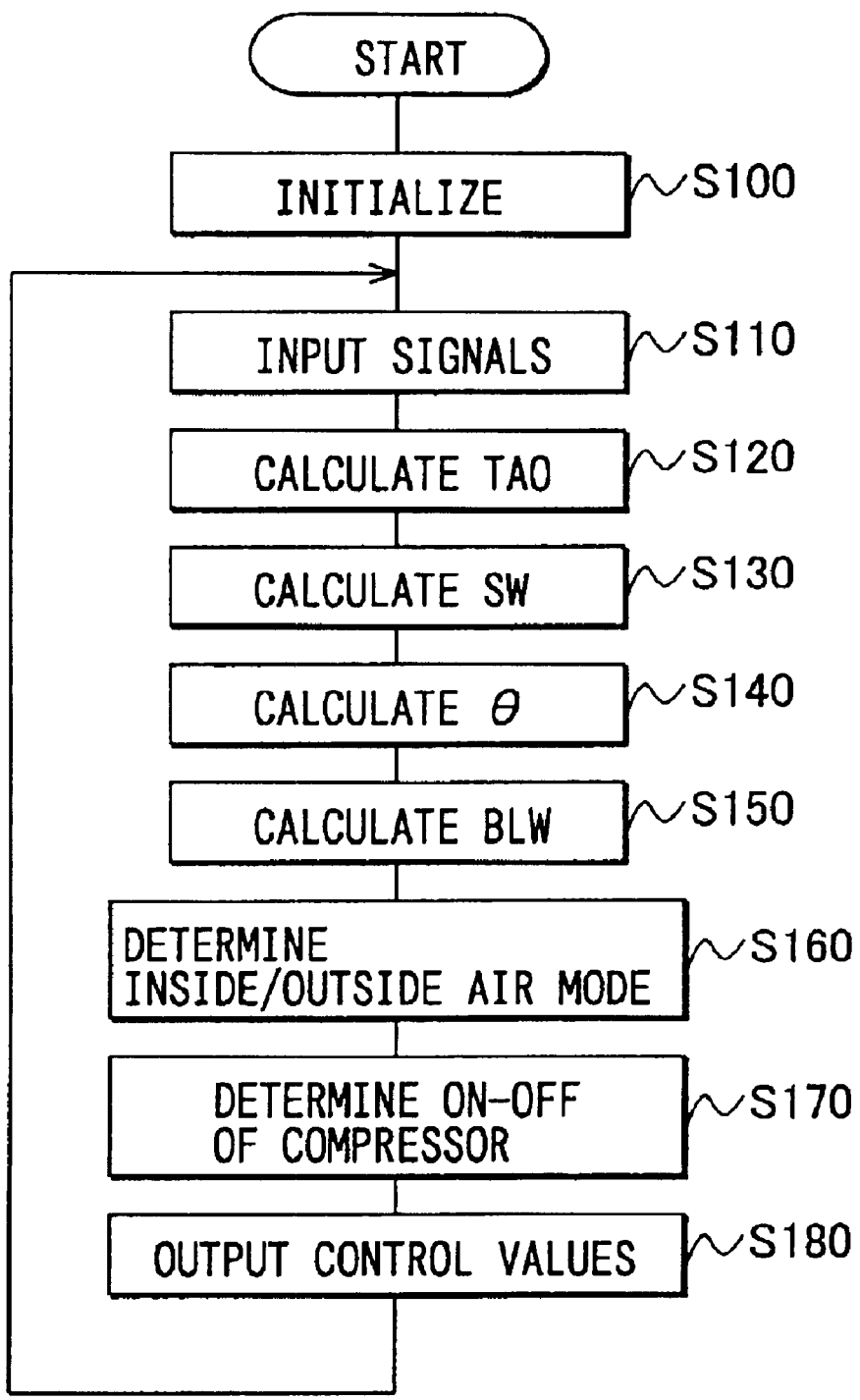
FIG. 8 is a flow diagram showing control operation of the electronic control unit (ECU) according to the first embodiment.

The flow diagram shown in FIG. 8 is an outline of a control operation executed by the microcomputer of the ECU 60. When the automatic switch 55 of the air-conditioning operation panel 50 is turned on in a state where an ignition switch of the vehicle engine is turned on and is energized, a control routine shown in FIG. 8 is started.

At step S100, a flag, a timer and the like are initialized. At step S100, detection signals from the sensor group 61, operation signals from the air-conditioning operation panel 50 and the like are read.

Next, at step S120, a target blow temperature (TAO) of conditioned air to be blown into a passenger compartment is calculated based on the following formula (1). The target blow temperature (TAO) is an air temperature required for maintaining the passenger compartment at a set temperature Tset of the temperature setting member 52.

$$TAO = Kset \times Tset - Kr \times TR - Kam \times TAM - Ks \times TS + C \quad (1)$$

wherein: TR indicates an inside air temperature inside the passenger compartment, TAM indicates an outside air temperature outside the passenger compartment, TS indicates a solar radiation amount, Tset indicates a set temperature, each of Kset, Kr, Kam and Ks indicate control gains, and C indicates a correction constant.

At step S130, a target opening degree SW of the air mixing door 16 is calculated by the following formula (2).

$$SW = [(TAO - TE)/(TW - TE)] \times 100 (\%) \quad (2)$$

In the formula (2), the target opening degree SW is calculated as percentage, when the maximum cooling position where the air passage to the heater core 13 is entirely closed is defined as 0% and the maximum heating position where the cooling air bypass passage 15 is entirely closed is defined as 100%.

At step S140, a target operation angle θ of the actuator 27 is calculated. The characteristics of the air mixing door 16 shown in FIG. 5 at the lower side are beforehand stored in the ROM as a map, and the target operation angle θ is calculated using the target opening degree SW and the operation position signals from the automatic switch 55 and the mode switching knob 51.

That is, when only the automatic switch 55 is turned on, and when the multi-mode switch 51a and the defroster switch 51b are not turned on, it is determined that the automatic range is selected in FIG. 5, and the target operation angle θ of the actuator 27 is calculated in a range of 0°–θ5 in FIG. 5, based on the target opening degree SW of the air mixing door 16. Accordingly, the air outlet mode is automatically selected among the face mode, the bi-level mode and the foot mode, in accordance with the change of the target opening degree SW of the air mixing door 16.

When the face mode is selected, the face opening 22 is opened, so that conditioned air is blown toward the upper side in the passenger compartment from the face air outlets 72, 73. When the bi-level mode is selected, both the face opening 22 and foot opening 24 are opened, so that conditioned air is blown to both upper and lower sides in the passenger compartment simultaneously from the face air outlets 72, 73 and the foot air outlets 25.

Further, when the foot mode is selected, the foot opening 24 is fully opened, and the defroster opening 19 is slightly opened, so that conditioned air is blown toward the lower side in the passenger compartment from the foot air outlets 25 while being slightly blown from the defroster air outlet 71 toward the inner surface of the windshield. In this embodiment, in the foot mode, only the foot opening 24 may be opened so that conditioned air is blown only toward the lower side (passenger's foot area) in the passenger compartment.

On the other hand, when the multi-mode switch 51a of the mode switching knob 51 in FIG. 6 is turned on, the target opening angle of the actuator 27 is calculated in the range between θ6–74 7 in FIG. 5, based on the target opening degree SW of the air mixing door 16. Accordingly, the air outlet mode is manually set to the multi-mode, and the temperature of air blown into the passenger compartment is controlled in an entire area between the maximum cooling position (MC) and the maximum heating position (MH) of the air mixing door 16 in the multi-mode.

Further, when the defroster mode switch 51b of the mode switching knob 51 in FIG. 6 is turned on, the target opening angle θ of the actuator 27 is calculated in the range between θ8–θ9 in FIG. 5, based on the target opening degree SW of the air mixing door 16. Accordingly, the air outlet mode is manually set to the defroster mode, and the temperature of air blown into the passenger compartment is controlled in the entire area between the maximum cooling position (MC) and the maximum heating position (MH) of the air mixing door 16 in the defroster mode.

Next, at step S150 in FIG. 8, a target air amount BLW blown by the blower fan of the blower unit is calculated using the target blow temperature TAO. As well known, the target air amount BLW is calculated so as to be larger at a high temperature side (maximum heating side) of the target blow temperature TAO and a low temperature side (maximum cooling side) thereof and so as to be smaller at an intermediate temperature region of the target blow temperature TAO.

At step S160, the inside/outside air mode is determined in accordance with the target blow temperature TAO. As well known, as the target blow temperature TAO increases from a low temperature side to a high temperature side, the inside/outside air mode is set so as to be switched from an inside air mode to an outside air mode or so as to be switched from an entire inside air mode to an entire outside air mode through an inside/outside air mixing mode. When the inside air mode or the outside air mode is manually set by the inside/outside air switch 54, the manually set mode is determined as the inside/outside air mode.

At step S170, it is determined whether the operation of the compressor is turned on or turned off. Specifically, a target evaporator air temperature TEO is calculated using the target blow temperature TAO and the outside air temperature TAM. When an evaporator air temperature TE is higher than the target evaporator air temperature TEO (TE>TEO), the compressor is turned on. When the evaporator air temperature TE is equal to or lower than the target evaporator air temperature TEO (TE≦TEO), the compressor is turned off.

At step S180, control values, calculated at the steps S140–S170, are output to the actuators 27, 63, the blower motor 64 and the solenoid clutch 65, respectively, thereby controlling air-conditioning operation of the vehicle air conditioner.

That is, the actuator 27 is controlled so that an actual operation angle of the actuator 27 detected by the position detection sensor 62 becomes equal to the target operation angle θ calculated at the step S140. More specifically, when the actual operation angle is not equal to the target operation angle θ, the actuator 27 is energized and is operated by the ECU 60.

The actuator 27 can be rotated clockwise and counterclockwise by reversing a voltage applied to the actuator 27. When the actual operation angle becomes equal to the target operation angle θ due to operation of the actuator 27, a power supply to the actuator 27 is stopped by the ECU 60, and the operation of the actuator 27 is stopped.

A rotation speed of the blow motor 64 is controlled by controlling a voltage applied thereto so that the target air amount BLW can be obtained. The driving actuator 63 controls an operation position of an inside/outside door (not shown) so that an inside/outside air mode determined at the step S160 can be obtained. The solenoid clutch 65 performs on-off operation control of the compressor so that the actual evaporator air temperature TE becomes equal to the target evaporator air temperature TEO.

According to the first embodiment of the present invention, because the air mixing door 16 and the mode switching doors 20, 23, 26 are driven by the one actuator 27, the number of actuators used in the vehicle air conditioner is reduced and an electrical circuit structure of the ECU 60 is simplified due to its reduction, thereby largely reducing production cost.

In the vehicle air conditioner, in the automatic range of the operation angle of the actuator 27, one of the face mode, the bi-level mode and the foot mode is automatically selected in accordance with the opening degree of the air mixing door 16, as shown in FIG. 5. On the other hand, in the manual range of the operation angle of the actuator 27, one of the mode switches 51a, 51b of the mode switching knob 51 is manually selected, so that only the multi-mode (fully open mode) or the defroster mode is manually set.

According to experiments by the inventors of this application, the multi-mode is necessary for satisfying the plural passenger's requests in FIG. 9. That is, the plural passenger's requests are the reason for setting the multi-mode. As shown in FIG. 9, when the multi-mode (i.e., full open mode) is set, almost the passenger's requests can be satisfied. In the first embodiment, by setting the multi-mode in the manual range, the necessary modes corresponding to passenger's requests shown in FIG. 9 can be satisfied.

When the multi-mode is set in FIG. 2A, the function of the bi-level mode can be obtained. In FIG. 2A, because the center face air outlets 72 are opened by the shutting mechanisms 72a, air is blown toward the face side of the passenger in the passenger compartment from the center face air outlets 72 and the side face air outlets 73, as shown by the arrows A in FIG. 2A. Simultaneously, air is blown from the defroster air outlet 71 as shown by the arrows C in FIG. 2A. Here, the air amount blown from the defroster air outlet 71 can be reduced by controlling the opening degree of the defroster door 20 and by controlling a flow resistance of air flowing toward the defroster air outlet 71.

In the multi-mode with the center face air outlets 72 opened by the shutting mechanism 72a, the function of the bi-level mode can be readily obtained, and a passenger's request for selecting the bi-level mode can be readily satisfied.

On the other hand, when the multi-mode is set in FIG. 2B, the function of the foot/defroster mode can be obtained. In FIG. 2B, because the center face air outlets 72 are closed by the shutting mechanisms 72a, air is not blown from the center face air outlets 72. Accordingly, air is blown toward a side upper side of the passenger in the passenger compartment or toward the windshield from the side face air outlets 73 as shown by the arrows A in FIG. 2B. Simultaneously, air is blown toward the foot area of the passenger in the passenger compartment from the foot air outlet 25 as shown by the arrows B in FIG. 2B, and air is blown toward the windshield from the defroster air outlet 71 as shown by the arrows C in FIG. 2B. In FIG. 2B, because air is not blown from the center face air outlets 72 having a smallest air resistance, the air amount blown from the defroster air outlet 71 is increased as compared with that in FIG. 2A, and the defrosting function can be improved.

Figure 13:
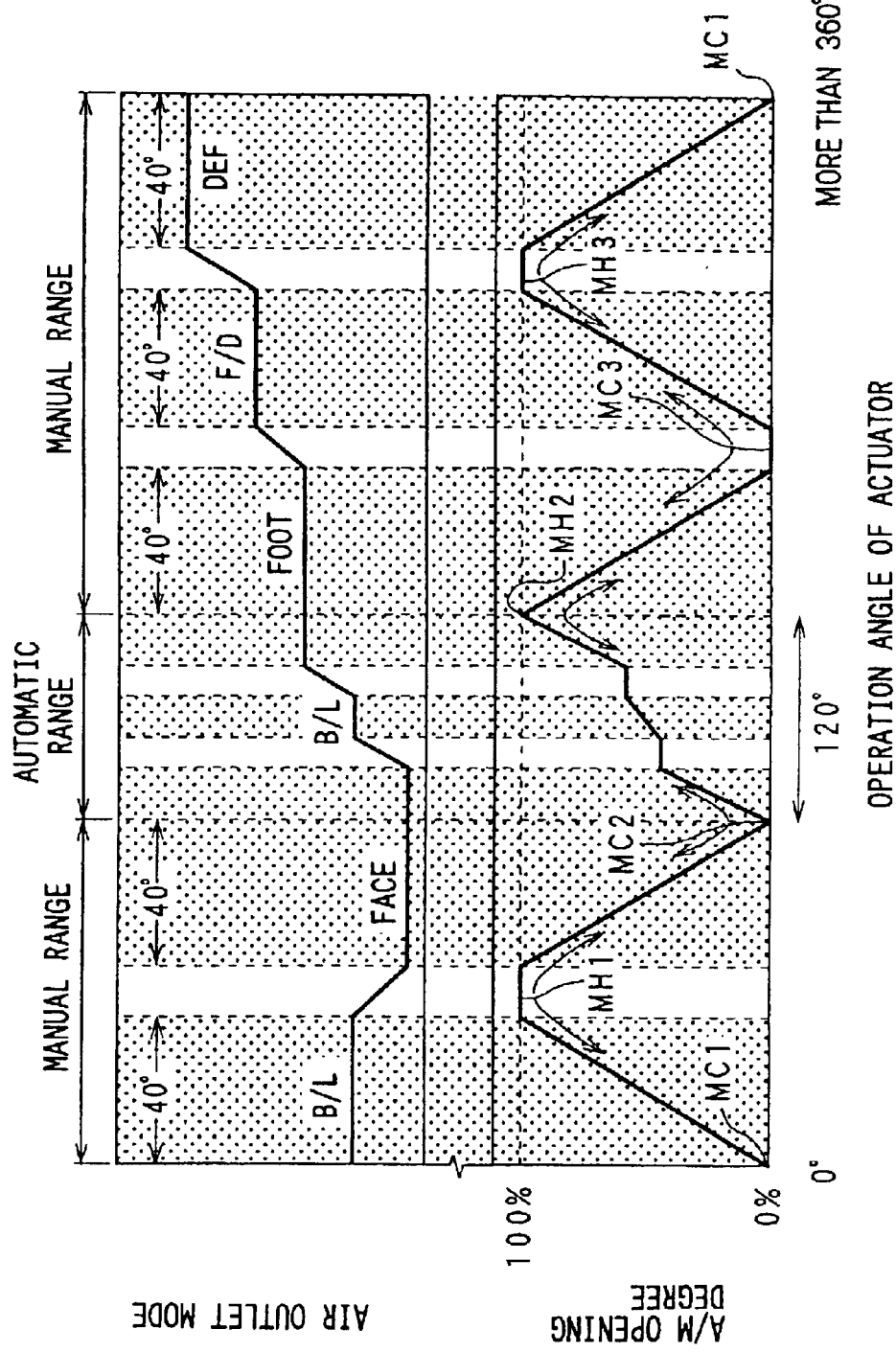
FIG. 13 is a view for explaining operation characteristics of a vehicle air conditioner in a comparison example.

In the first embodiment of the present invention, only the multi-mode or the defroster mode is manually set as the air outlet mode, in the manual range of the operation angle of the actuator 27. Therefore, an operation angle of the actuator 27, need for manually setting the manual air outlet mode, can be made smaller. Specifically, in the example of FIG. 5, the operation angle of the actuator 27, for manually setting the air outlet mode, is 168° (288°–120°). In a comparison example where the operation pattern is shown in FIG. 13, the operation angle of the actuator, for manually setting the air outlet mode, is at least 240° (360°–120°). In FIG. 13, MC1, MC2, MC3 indicate the maximum cooling positions of the air mixing door, and MH1, MH2, MH3 indicate the maximum heating positions of the air mixing door. Accordingly, in the first embodiment, the operation angle of the actuator 27, for manually setting the manual air outlet mode, can be reduced as compared with the comparison example.

Further, in the first embodiment, only the multi-mode and the defroster mode are manually set. Therefore, when the air outlet mode is manually changed, air temperature change can be reduced, and air-conditioning feeling given to the passenger in the passenger compartment can be improved, as compared with the comparison example.

Because the multi-mode is the full open mode satisfying various passenger's requests, the frequency for using the multi-mode is higher than defroster mode. Accordingly, in the first embodiment of the present invention, as shown in FIG. 5, the multi-mode is set adjacent to the automatic range (i.e., foot mode of the automatic range), relative to the change of the operation angle of the actuator 27. Therefore, the change of the operation angle of the actuator 27, when the operation mode is moved from the automatic range to the multi-mode, can be made smaller, and a moving time for which the automatic range is moved to the multi-mode can be made shorter. In addition, a temperature change in the air blown into the passenger compartment, due to the movement from the automatic range to the multi-mode of the manual range, can be reduced, as shown in FIG. 5.

In the multi-mode with the center face air outlets 72 opened by the shutting mechanism 72a, the function of the bi-level mode can be readily obtained, and a passenger's request for selecting the bi-level mode can be readily satisfied. As shown in FIG. 5, only when the operation angle of the actuator 27 in the maximum heating area of θ5–θ6 passes once, the mode operation can be moved from the automatic range to the multi-mode.

Figure 10:
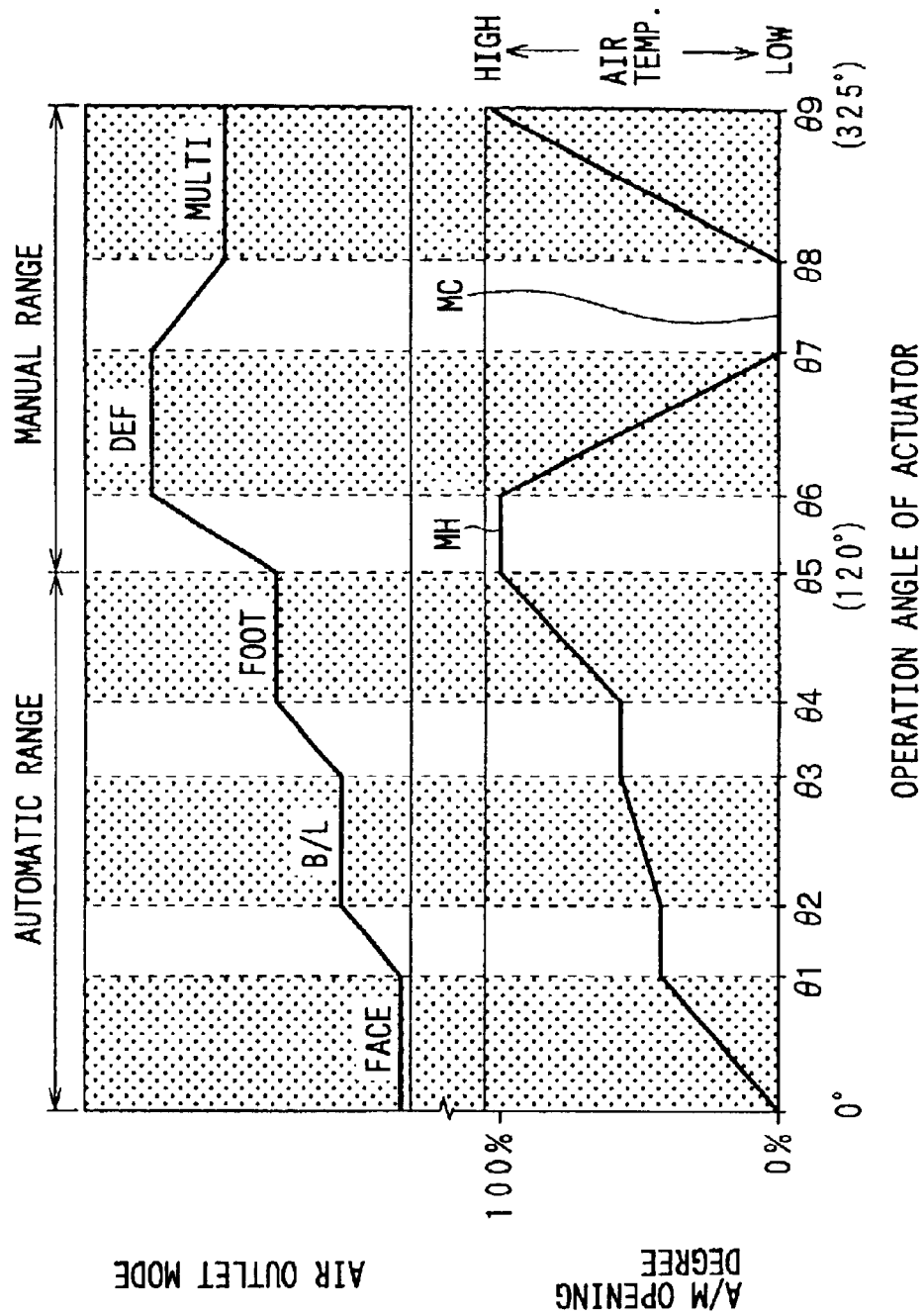
FIG. 10 is a view for explaining operation characteristics of the vehicle air conditioner according to a second preferred embodiment of the present invention.

A second embodiment of the present invention will be now described with reference to FIG. 10.

In the above-described first embodiment of the present invention, the multi-mode of the manual range is set adjacent to the automatic range, as shown in FIG. 5. However, in the second embodiment, the defroster mode of the manual range is set adjacent to the automatic range (i.e., foot mode of the automatic range). The defroster mode is manually set in a condition where the windshield is readily fogged. That is, the defroster mode is important for a safety drive, and is necessary to be rapidly performed.

Accordingly, in the second embodiment, the defroster mode of the manual range is set adjacent to the automatic range, for rapidly performing the defrosting operation. Therefore, the movement from the automatic range to the defroster mode of the manual range can be performed in a short time by a relative small change amount of the operation angle of the actuator 27. Thus, after the defroster mode is manually set by a passenger in the passenger compartment, the defrosting operation for defrosting the windshield can be started by a short time.

A third embodiment of the present invention will be now described with reference to FIG. 11. In the above-described first embodiment, the push-button operation member shown in FIG. 6 is used as the mode switching knob 51. However, in the third embodiment, as shown in FIG. 11, a lever-shaped mode switching knob 51 slidably operated through a guide slot 56 can be used. Even in this case, the advantage described in the first and second embodiments can be obtained. In addition, in the third embodiment, one of an automatic mode, the multi-mode and the defroster mode can be manually set by the mode switching knob 51.

A fourth embodiment of the present invention will be now described with reference to FIG. 12. In the fourth embodiment, as shown in FIG. 12, a mode switching knob 51 composed of a rotary member operated rotatably can be used. Even in this case, the advantage described in the first and second embodiments can be obtained. In addition, in the fourth embodiment, one of the automatic mode, the multi-mode and the defroster mode can be manually set by the mode switching knob 51, similarly to the third embodiment.

Although the present invention has been fully described in connection with the preferred embodiments thereof with reference to the accompanying drawings, it is to be noted that various changes and modifications will become apparent to those skilled in the art.

For example, in the above-described embodiments, the air mixing door 16 shown in FIG. 1, for adjusting a mixing ratio between cool air passing through the cool air bypass passage 15 and warm air passing through the heater core 13, is used as the temperature control unit for controlling the temperature of air blown into the passenger compartment. However, a hot water valve, for adjusting an amount of hot water flowing through the heater core 13, or the like can be used as the temperature control unit.

In the above-described embodiments, three plate-like doors 20, 23, 26 are used as the mode switching doors. When a rotary door having a half circular tube shape, a flexible resin film door or the like is used as the mode switching doors, the mode switching doors can be formed by an integrated single door member.

Such changes and modifications are to be understood as being within the scope of the present invention as defined by the appended claims.

What is claimed is:

1. An air conditioner for a vehicle having a passenger compartment, the air conditioner comprising:

an air conditioning case defining an air passage through which air flows, the air conditioning case having a face opening from which air is blown toward an upper side of the passenger compartment, a foot opening from which air is blown toward a lower side of the passenger compartment and a defroster opening from which air is blown toward a windshield;

a temperature control unit for controlling the temperature of air blown into the passenger compartment;

a mode switching member for opening and closing the face opening, the foot opening and the defroster opening, to select one mode from among a plurality of air outlet modes;

a single actuator attached to the temperature control unit and the mode switching member for driving both the temperature control unit and the mode switching member, the actuator being operated in a first operating angle range and in a second operating angle range different from the first operating angle range; and a control unit in communication with the single actuator for controlling operation of the actuator, wherein:

the control unit sets an automatic range in the first operating angle range of the actuator wherein one mode from among the plurality of air outlet modes is selected by the mode switching member in accordance with a position of the temperature control unit;

the control unit sets a manual range in the second operating angle range of the actuator, wherein one of predetermined modes is selected by the mode switching member, regardless of the position of the temperature control unit;

the predetermined modes in the manual range are only a multi-mode where air is blown simultaneously from the face opening, the foot opening and the defroster opening, and a defroster mode where air is blown from the defroster opening; and the face opening is adapted to communicate with a center face air outlet provided at a center of a dashboard in the passenger compartment such that air from the face opening is blown toward the upper side in the passenger compartment through the center face air outlet, the air conditioner further comprising a shutting mechanism disposed in the center face air outlet to prohibit air flow from the center face air outlet.

2. The air conditioner according to claim 1, wherein:

the air outlet modes in the automatic range include a face mode where air is blown from the face opening, a bi-level mode where air is blown from both the face opening and the foot opening, and a foot mode where air is blown from the foot opening.

3. The air conditioner according to claim 1, wherein:

the multi-mode in the manual range is set adjacent the automatic range relative to a change of the operating angle of the actuator.

4. The air conditioner according to claim 1, wherein:

the defroster mode in the manual range is set adjacent the automatic range relative to a change of the operating angle of the actuator.

5. The air conditioner according to claim 1, further comprising an operation member in communication with the actuator and operated to change an operation angle of the actuator, wherein:

the operation member is disposed to manually set the multi-mode and the defroster mode in the manual range.

6. The air conditioner according to claim 1, wherein:

the first operating angle is between zero and a first predetermined angle; and the second operating angle range is between the first predetermined angle and a second predetermined angle larger than the first predetermined angle.

7. The air conditioner according to claim 1, further comprising:

a heat exchanger, disposed in the air conditioning case, for changing temperature of air passing therethrough, wherein the temperature control unit is an air mixing door for adjusting a ratio between an air amount passing through the heat exchanger and an air amount bypassing the heat exchanger.

8. The air conditioner according to claim 1, further comprising:

a heating heat exchanger, disposed in the air conditioning case, for heating air passing therethrough, wherein the temperature control unit is a water valve for adjusting a flow amount of hot water flowing into the heating heat exchanger.

9. The air conditioner according to claim 1, wherein the air conditioning case has a side face passage through which air from the face opening is always introduced, the side face passage being in communication with side face air outlets provided at right and left sides on a dashboard such that air is always blown from the side face air outlets in each of the air outlet modes.

10. The air conditioner according to claim 9, wherein:

when the shutting mechanism opens the center face air outlets in the multi-mode, air is simultaneously blown from the center face air outlets, the side face air outlets, the foot opening and the defroster opening.

11. The air conditioner according to claim 1, wherein:

the actuator includes a servomotor for driving both the temperature control unit and the mode switching member.

12. The air conditioner according to claim 1, wherein the temperature control unit is operated in a range between a maximum cooling position and a maximum heating position.

13. The air conditioner according to claim 12, wherein:

the temperature control unit is operated in the range between the maximum cooling position and the maximum heating position, in the multi-mode of the manual range.

14. The air conditioner according to claim 12, wherein:

the temperature control unit is operated in the range between the maximum cooling position and the maximum heating position, in the defroster mode of the manual range.

15. The air conditioner according to claim 1, wherein the temperature control unit and the mode switching member are alternately driven by the actuator.

16. The air conditioner according to claim 1, wherein the mode switching member includes a plurality of mode doors which open and close the face opening, the foot opening and the defroster opening, respectively.

* * * * *